United States Patent [19]

Stout

[11] Patent Number: 4,600,646

[45] Date of Patent: Jul. 15, 1986

[54] METAL OXIDE STABILIZED CHROMATOGRAPHY PACKINGS

[75] Inventor: Richard W. Stout, Wilmington, Del.

[73] Assignee: E. I. Du Pont de Nemours and Company, Wilmington, Del.

[21] Appl. No.: 640,821

[22] Filed: Aug. 15, 1984

[51] Int. Cl.$^4$ .................... B32B 5/16; B32B 6/04; B32B 17/10

[52] U.S. Cl. .................... 428/405; 428/404; 428/406; 435/803

[58] Field of Search ............... 428/404, 405; 435/803

[56] References Cited

U.S. PATENT DOCUMENTS

| | | | |
|---|---|---|---|
| 3,301,635 | 1/1967 | Bergna et al. | 23/182 |
| 3,591,518 | 12/1968 | McMillan | 252/313 |
| 3,783,101 | 1/1974 | Tomb et al. | 195/63 |
| 3,855,172 | 12/1974 | Iler et al. | 260/39 |
| 3,910,851 | 10/1975 | Messing | 252/455 |
| 3,956,179 | 5/1976 | Sebastian et al. | 252/430 |
| 4,010,242 | 3/1977 | Iler et al. | 423/335 |
| 4,331,706 | 5/1982 | Kindrick | 428/404 |
| 4,415,631 | 11/1983 | Schutijser | 428/405 |
| 4,454,056 | 6/1984 | Kittelmann et al. | 428/405 |

Primary Examiner—Allan M. Lieberman
Attorney, Agent, or Firm—George A. Frank

[57] ABSTRACT

Surface-stabilized porous silica having discontinuous metal oxide layer over the silica, chromatographic packings based on the metal-stabilized silica and processes for their preparation, are provided. The chromatographic packings so provided have increased life time.

15 Claims, No Drawings

METAL OXIDE STABILIZED CHROMATOGRAPHY PACKINGS

TECHNICAL FIELD

This invention relates to stabilized, porous silica bodies having partial surface coverage of a metal oxide (e.g., zirconium oxide) and more particularly to metal oxide coated silica having organosilane coatings subsequently applied.

BACKGROUND ART

The relatively poor stability to aqueous eluents at elevated pH of chromatography column packing materials containing organic coatings covalently attached directly to the silanol groups on the surface of silicon oxide (silica) is well known. Chromatography columns prepared with these packings generally begin to lose resolving power when these covalent bonds are hydrolyzed from the packing surfaces to a significant degree. This degeneration results in reduced chromatographic column utility manifested by reduced periods of use or diminished separation capability. There is a need for chromatographic packings which are relatively inexpensive, each to manufacture, and maintain acceptable functional properties over extended periods to make long-term, repeated uses possible.

A method for improving the water-durability of controlled pore glass (CPG)-immobilized enzymes was introduced in U.S. Pat. No. 3,783,101, issued Jan. 1, 1974 to Tomb et al. Inorganic carriers, for example, CPG were coated with various metal oxides, including zirconium oxide, and fired at between 200° C. and 800° C. to form a continuous metal oxide layer on the CPG surface. The metal oxide layer was silanized for subsequent functional group immobilization. A continuous barrier was formed between the CPG and the silane coupling agent by the metal oxide layer so that no interaction of glass and silane occured. Enzymes immobilized on the silanized, metal oxide coated CPG exhibited longer half-lives of activity than enzymes immobilized on either uncoated CPG or silanized, uncoated CPG. This improvement is said to be caused by the continuous metal oxide coating over the inorganic carrier surface which inorganic carrier was less water durable than the metal oxide.

U.S. Pat. No. 3,910,851, issued Oct. 7, 1975 to Messing, discloses that pore size in CPG can be optimized with respect to molecular sizes of substrate added to, and/or enzymes immobilized on, CPG, to provide an improved surface area for enzyme immobilization without risking excessive enzyme losses from pore surfaces due to flow-through turbulence. Uniform pore size porous inorganic bodies were prepared from sol particles of $SiO_2$, $Al_2O_3$ or $TiO_2$ using water-soluble zirconium compounds as binder. A slurry of sol particles having a specified diameter range was treated with a zirconium binder, the mixture dried and fired at temperatures in the range 450° to 800° C. When $SiO_2$ sol particles were used, for example, the firing step provided zirconium silicates to impart physical stability. While the use of zirconium binders imparts control of resulting pore size distributions when slurries are dried and fired below sintering temperatures, the process results in solid aggregates unsuitable for chromatography.

It has been found that the stabilized bodies, especially the stabilized microspheres produced by this invention, comprising porous silica microspheres with surfaces partially covered by metal oxides, retain the highly controlled pore size distribution of the starting material silica microspheres. The discontinuous metal oxide coating imparts hydrolytic stability to subsequently applied organosilane coatings over the pH range 3.0 to 9.0. The organo-silane coatings can be modified by known methods to produce a wide variety of stable chromatographic packings.

DISCLOSURE OF THE INVENTION

The stabilized bodies of this invention are surface-stabilized, porous silica bodies having uniform pore size and a particle diameter range of about 0.5–100 microns and partial surface coverage of metal oxide in quantities insufficient to form a continuous layer over the silica, thereby providing a surface mosaic of metal oxide and silicon oxide.

The chromatographic packings of this invention are surface-stabilized, porous silica bodies having uniform pore size and a particle diameter range of about 0.5–100 microns and partial surface coverage of metal oxide in quantities insufficient to form a continuous surface layer over the silica and having a covalently attached organosilane coating. These packings can be further modified to produce high performance liquid chromatographic packings including: weak and strong anion exchange, weak and strong cation exchange, hydrophobic, affinity, and other ligand chromatographic packings.

The stabilized silica bodies of this invention are prepared by heating chromatographic packings (e.g., Zorbax ® packings) with water soluble metal salts under reduced pressure and subsequently heating at 600°–1000° C. the dried reaction product.

DETAILED DESCRIPTION OF THE INVENTION

The stabilized bodies of the present invention can be prepared by starting with uniform-sized silica microspheres disclosed in U.S. Pat. No. 3,855,172, issued Dec. 17, 1976 and U.S. Pat. No. 4,010,242 issued Mar. 1, 1977, incorporated herein by reference. Briefly, these inorganic microspheres are prepared by the following process:

a. forming a sol of uniform-sized colloidal silica particles in a polar liquid, wherein the colloidal particles have hydroxylated surfaces and are dispersible in said polar liquid;
b. forming a mixture of the sol with a polymerizable organic material which is initially sufficiently miscible in said polar liquid to form a uniform mixture;
c. initiating polymerization of the organic material in said mixture to cause coacervation of the organic material and said colloidal particles into substantially spherical microspheres having a diameter of about 0.5–20.0 microns;
d. solidifying the microspheres so formed;
e. collecting, washing and drying said microspheres; and
f. oxidizing said microspheres to elevated temperatures to burn off the organic material without melting said colloidal particles.

Colloidal silica particles in the size range of 5–500 millimicrons with urea/formaldehyde or melamine/formaldehyde as the polymerizable organic material are used. After drying, the microspheres are subjected to temperatures between 500° and 1000° C. to burn off the organic material without melting the inorganic colloidal particles. The elevated temperatures are preferably chosen so as to cause sintering and the formation of Si—O—Si networks to provide mechanical strength to the porous microspheres. These products are available as Zorbax ® packings (registered trademark of E. I. du Pont de Nemours Co., Inc., Wilmington, De. 19898).

The stabilized silica bodies of the present invention retain the inherent good properties of the Zorbax ® packings: uniform particle diameter and a large pore diameter to surface area ratio that allows rapid diffusion of materials to all parts of the inner particle surface. The unexpected improvement of the new material resides in the greatly improved hydrolytic stability of chromatographic packings produced by the partial coverage of silica surfaces by a metal oxide such as zirconium oxide in quantities insufficient to form a continuous layer. The discontinuous surface mosaic of the metal oxide and silicon oxide so produced is available for subsequent reactions with desired organic coating materials.

Although Zorbax ®-based packings of the present invention are preferred, other porous silica bodies such as those disclosed in U.S. Pat. No. 3,301,635, issued Jan. 31, 1967 to H. E. Bergna et al., or in U.S. Pat. No. 3,591,518 issued July 6, 1971 to D. McMillan, are also expected to be useful.

In all cases, the porous silica starting material is chosen to provide properties of average pore diameter, particle diameter, surface properties, etc. which are best suited to the desired chromatographic purpose; see L. R. Snyder and J. J. Kirkland, Introduction to Modern Liquid Chromatography, Second Edition, Wiley-Interscience, New York, 1979, Chapter 5.

A variety of water-soluble metal compounds can be suitable to provide a partial metal oxide coverage for the silica bodies, such as: $Fe(NO_3)_3$, $CoCl_2$, $La(NO_3)_3$, $Al_2(OH)_5Cl$, $ZrCl_4$, $ZrBr_4$, $ZrOSO_4$, $ZrO(NO_3)_3$, $ZrOCl_2$, $ZrOCO_2$, and their mixtures. Water soluble salts of other metals can also be suitable, such as: Ti, Mo, Hf, Ni, Zn, and Th. The preferred compound is $ZrOCl_2$.

The process of this invention utilizes the following steps:
(a) mixing an aqueous suspension of porous silica bodies with an aqueous solution of a metal compound both in amounts sufficient to provide a final average coverage in the range of approximately 0.25 to less than 4 μmol metal compound per square meter of silica surface area;
(b) removing trapped air from the silica body pore structure, for example, by boiling the suspension at reduced pressure;
(c) separating the solids from the solution;
(d) drying the solids to remove surface moisture; and
(e) heating to temperatures in the range of 600°–1000° C. for from 10 to 72 hours.

The porous silica bodies can be added to water in a predetermined amount relative to the concentration of the water-soluble metal salt in order to prepare metal-stabilized silica bodies with partial surface coverage in the range 0.25 to less than 4 μmoles metal oxide/m² silica surface. It is preferred that final surface coverage be about 1 μmole metal oxide/m² silica surface. It is known that there are approximately 8–9 μmoles of hydroxyl groups per m² of regular silica surface and, therefore, based on steric considerations the theoretical maximum number of metal oxides which could be formed into a monolayer on a regular silica surface is approximately 4 μmole/m². To achieve discontinuous (partial) metal oxide coverage on the silica surface, therefore, requires less than 4 μmoles of metal salt/m².

The final metal oxide coverage of a given stabilized silica preparation resulting from the process of this invention can be determined by subjecting the stabilized product to inductively-coupled plasma/atomic emission spectroscopy (ICP/AES). This quantitative technique measures the amount of metal associated with the silica. The metal oxide can then be calculated from this by assuming that surface hydroxyl groups react with each metal ion. The ratio of this number to the surface area of the porous silica starting material provides an estimate of the metal oxide coverage of the stabilized porous silica body surface.

The porous silica bodies can be added to water in a predetermined amount relative to the concentration of the water-soluble metal compound, in order to prepare a silica slurry in the range 1–10% (w/w), preferably 3–7% (w/w), and most preferably 5% (w/w), when the metal compound is present in solution at 0.3–10% (w/v), preferably about 1% (w/v). Further illustration of this relationship in Table 1 shows that surface coverage increases in a regular fashion for a given porous silica material with increasing levels of metal salt applied according to the process of this invention.

Zorbax ®150 packing having 144 m²/gram surface area was treated with three levels of $ZrOCl_2$. The resulting products were analyzed by ICP/AES to determine the amount of zirconium associated with the Zorbax ® packing; the weight percent values found, 0.8, 1.2, and 1.4, respectively, were converted to microgram atom/m².

TABLE 1

| $ZrOCl_2$ (mM)* | Zr (μg atom/m²) |
|---|---|
| 17 | approx. 0.6 |
| 34 | approx. 0.9 |
| 68 | approx. 1.1 |

*A 1.1% (w/v) solution of $ZrOCl_2.8H_2O$ is equivalent to a 34 mM solution.

The purpose in providing a low concentration of silica solids in a dilute metal compound solution is to insure that the particles will be loosely packed and to prevent microcrystalline metal salt deposits at particle junctions, respectively. Moreover, the use of dilute metal solutions reduces the likelihood of sequestering relatively high metal salt concentrations in particle pores where microcrystallization might disadvantageously affect chromatographic performance.

As an example, the silica solids slurry containing the selected water-soluble metal salt compound can be boiled at a temperature of about 80° C., under a reduced pressure of about 0.1 atmosphere to induce metal salt adsorption onto silica surfaces in a dynamic equilibrium process. The boiling period can range from 10 to 200 minutes, but should preferably be about 30 minutes or more to accomplish this adsorption.

The metal-treated particles are separated from the solution containing unbound metal compounds by any convenient means such as by filtration. removing excess metal compound in solution from the coated porous silica bodies is important. It is believed that only metal adsorbed onto silica surfaces during step (b) leads to the unexpected advantages derived from the stabilized bodies, while the deposition of excess metal compounds onto silica surfaces during the drying step (d), if permitted, would be harmful. The microcrystalline deposits, especially at particle junctions, might lead to the undesirable formation of metal silicates upon subsequent heating [step (e)] with the concomitant production of a "cake" of bound or cemented particles having poorly defined aggregate dimensions unsuitable for the chromatographic purposes of this invention.

The metal-treated bodies are air dried at or near room temperature by spreading over a broad, convenient surface until the particles no longer resemble a wet mass. Further drying can be carried out in a vacuum oven at pressures in the range of 33-100 Pa (approximately 10 to 30 inches Hg), preferably 66 Pa (approximately 20 inches Hg) at about 110° C. for a period sufficient to remove water from within particle pores. This process generally occurs over periods of about 2 hours, but can vary depending upon pressure and temperature. The dried, metal-treated bodies should flow freely without adhering to each other or to container walls.

The dried particles are then placed into a furnace and heated at temperatures in the range of 600°-1000° C., for periods of up to 24 hours. Preferably, the heating process can be performed at 800°-900° C. for 16 hours. The combination of time and temperature can be readily determined in the laboratory; longer times being required when lower temperatures are employed.

The resulting metal oxide-coated, stabilized, porous silica bodies retain substantially the same average pore size and, unexpectedly, particle diameter range of the starting silica particles indicating no aggregation. Therefore, the process of this invention advantageouly provides a product that maintains the original, desireable pore size and particle dimensions of the starting material, while also providing an improved, stabilized surface partially covered by a metal oxide.

The chromatographic packings of this invention are organosilane-coated stabilized silica particles (bodies). Suitable organosilanes are those silanes which contain at least one functional group capable of reacting with functional groups on the silica surface. Preferably, the silanes also contain additional functional groups permitting subsequent (or prior) attachment of various moieties suitable in diverse chromatographic applications and include silanes such as γ-glycidoxypropyltrimethoxysilane, γ-glycidoxypropyltriethoxysilane, γ-glycidoxypropylmethyldiethoxysilane, 3-chloropropyldimethylchlorosilane, and vinyldimethylchlorosilane. The preferred organosilane is γ-glycidoxypropyltrimethoxysilane.

The silanization process is well known. It can be accomplished, for example, by refluxing the stabilized silica particles of this invention with the selected organosilane in aqueous solution buffered in the pH range 3-9. Buffering in the pH range 5-9 is preferred. Suitable buffers include sodium phosphate, carbonate-bicarbonate, TRIS, etc. Preferred buffer ionic strengths are in the range 0.005-0.05M, especially 0.01M. The slurry is heated to reflux for an appropriate period ranging from 2-20 hours. The silanized product is separated from solution by any appropriate means such as by filtration, washed several times with water to remove unreacted organosilane, and dried.

These silanized packing can be used directly for high performance liquid chromatography (HPLC) for the separation of various macromolecules depending on the properties of the packings. Selection of average pore diameter in stabilized porous silica bodies can depend on the molecular size ranges of the materials to be separated. Since the metal oxide surface stabilizing treatment does not change significantly the average pore diameters or pore volume of untreated silica, the size exclusion limit of a given porous silica particles is not altered substantially during the stabilization process of this invention. The criteria for HPLC column packing selections, pore volume, physical characteristics of packing compression, eluent composition and pH, etc., are discussed by Mathes et al. in Chromatographia, Volume 14, 325-332 (1981). One advantage in using the stabilized porous silica particles of this invention for HPLC is that eluent pH may be extended above the pH value of 7.5, suggested by Mathes et al. as a maximum practical value, to pH 9.0 without experiencing the base-catalyzed hydrolytic degradation of conventional size exclusion HPLC silica packings.

The silanized silica packings can be further modified to produce a wide variety of improved packing materials for chromatography. These modifications are accomplished by conventional reactions and can also include the preparation of intermediate products for yet further modifications. The modifications can also be achieved by first reacting the silanizing reagent with the modifying reagent(s) and then reacting with the silica-surface. For example, reaction of 4-nitrophenylchloroformate with a glycidoxysilane coated material leads to a 4-nitrophenyl diol (4-NP diol) derivative. Other suitable reagents include N-hydroxysuccinimidylchloroformate, cyanogen bromide, 1,1'-carbonyldiimidazole, and tresylchloride. Further reaction of such 4-NP diol derivatives with polyamines, such as spermidine, 3,3'-iminobispropylamine, N,N-diethylaminoethylamine (DEAE), spermine, cadaverine, putrescine, etc. lead to the formation of urethane derivatives. Such modifications produce weak anion exchange packings which, when further reacted at the residual amino groups with, for example, an alkylhalide such as methyliodide to prepare quaternary amines with permanent positive charges, behave as strong anion exchange media in column packings. Alternatively, the weak anion exchange packings can be treated with a variety of electrophiles such as succinic anhydride to produce carboxyl derivatives which behave as weak cation exchange packings.

A strong cation exchange packing can be prepared from an appropriate silanizing agent such as γ-glycidoxypropyltrimethoxysilane and a sulfonated amine such as taurine. The diol-amine-sulfonate product is then used to silanize the stabilized silica particles resulting in a strong cation exchange packing.

The column packing of this invention can be used to advantage in ligand chromatography. Derivatization of the silanized packings can lead to covalent attachment of ligands such as peptides, proteins including enzymes, antibodies and their fragments, lectins, hormones, cell surface antigens of viral and bacterial origin, toxins, polysaccharides, nucleic acids including deoxyribonucleic and ribonucleic acids, and dyes. One application of such packings permits the elution of the material bound to its complementary immobilized ligand without contamination by the ligand itself because of the improved stability of the packings.

The column packings of this invention can also be used in hydrophobic chromatography. Separations of proteins, peptides and molecules containing long chain aliphatic regions can be achieved utilizing packings prepared for example by reacting alkyl amines such as $NH_2(CH_2)_nCH_3$ where n=1 to 24 (preferably n=4 and 8) with 4-NP diol derivatives described above.

Although the exact mechanism of stabilization imparted by the partial surface coverage of silica by metal oxide is not known, the following are possible explanations. The first explanation concerns a reduction in the available geminal silica diol [$O_2Si(OH)_2$] groups by partial depopulation through metal (M) attachments to create Si—O—M species. The discontinuous coating leaves a finite population of SiOH groups available to react with subsequently applied silanes or other desired functional groups since the metal oxide does not sterically hinder them. The enhanced stability seen with the novel chromatographic compositions may be related to the near complete elimination of surface $Si(OH)_2$ groups which might not occur if these geminal diols were not modified with metal prior to being derivatized.

Results of nuclear magnetic resonance (NMR) spectral determinations obtained with cross polarization of silicon-29 by protons indicate that Zorbax ® silica microspheres have a predominance of silanol groups ($O_3$-Si-OH) over silane diols [$O_2Si(OH)_2$] and silicon atoms with four siloxane attachments (—$O_4Si$). Zirconium-treated Zorbax ® silica microspheres of this invention show an almost complete disappearance of [$O_2Si(OH)_2$] groups and overall reduction of surface silanol groups. This procedure can be used to monitor the depletion of [$O_2Si(OH)_2$] groups by the metal treatments of silica bodies. Details of the NMR procedure can be found in G. E. Maciel et al., J. Am. Chem. Soc., Volume 102, 1007-1008 (1980).

Another explanation might be that the metal oxide reduces the equilibrium solubility of the adjacent SiOH surface groups, even at elevated pH values. This mechanism is analogous to reduction in equilibrium solubility of adjacent exposed silicon oxide surfaces caused by $Al^{+3}$ ions partially covering silica surfaces; see R. K. Iler, The Chemistry of Silica, Wiley-Interscience, New York, 1979, page 13.

The following examples illustrate the invention.

EXAMPLE 1

PREPARATION OF ZIRCONIUM STABILIZED POROUS SILICA MICROSPHERES

A suspension of 30.0 g Zorbax ®PSM 150 porous silica microspheres was prepared in 600 mL water which contained a 1.1% (w/v) solution of zirconyl chloride ($ZrOCl_2 \cdot 8H_2O$) at a final pH of 1.5 (prepared by adding 33 mL of a 20% (w/v) zirconyl chloride solution in water into the Zorbax ® suspension up to a final 600 mL volume). This suspension was 5% (w/w) solids. The suspension was boiled for 30 minutes at 0.1 atmosphere pressure to encourage zirconium adsorption and then filtered under vacuum through a sintered glass funnel. The filter cake was spread in a thin layer and air dried at room temperature overnight. The dry product was then transferred to a vacuum oven and heated at 110° C. at 20 inches of mercury for two hours to drive off any residual moisture. The oven-dried product was further heated to 800° C. for 16 hours in air in an electric furnace.

The stabilized porous silica microspheres so prepared were analyzed by ICP/AES according to conventional procedures described in J. H. Calivas et al., Analytical Chemistry, Volume 53, 2207 (1981). The zirconium content was 1.2% (w/w) corresponding to approximately 0.9 μ-gatom/m².

EXAMPLE 2

SILANIZATION OF ZIRCONIUM STABILIZED POROUS SILICA MICROSPHERES

The stabilized product of Example 1 (30.0 g) was placed in a round-bottomed flask containing 350 mL of 0.01M $Na_2HPO_4$ buffer (pH 8.8). 34 mL of γ-glycidoxy-propyltrimethoxysilane was added and refluxed at 90° C. for 16 hours. The silanized product was washed with water then THF and dried in a vacuum oven at 110° C. (22 inches mercury). Elemental analysis of the diol product indicated 3.96% C, 0.84% H, and 0.0% N.

EXAMPLE 3

COMPARATIVE STABILITY OF ZIRCONIUM STABILIZED AND UNSTABILIZED POROUS SILICA MICROSPHERES

The zirconium stabilized silica microsphere chromatographic packing prepared in Example 2 and an unstabilized, silanized silica microsphere diol (based on Zorbax ®PSM 150) were packed into separate liquid chromatography columns (0.62×25 cm) by conventional procedures. Identical repeat samples containing a mixture of 10 μg bovine serum albumin, 10 μg ovalbumin, and 10 μg lysozyme in eluent buffer were applied to each column and eluted with a 0.2M $(NH_4)_2SO_4$/0.05M Tris buffer (pH 8.25). This process was repeated to determine the number of samples which could be successfully separated on each column type without loss of packing integrity.

The number of times samples may be successfully processed through a reuseable column is commonly referred to as the number of throughput fluid column volumes which can be processed by a particular packing and still obtain separation of sample components.

Aliquots of both column packings were subjected to carbon analysis by incineration after successive column volume passages of eluent to determine weight loss, if any, sustained by the column packing through hydrolytic degradation and/or removal of the organosilane coating. Column packing aliquots were also subjected to nitrogen analysis by Kjeldahl analysis, to confirm that the carbon content detected in the incineration procedure was due to the silane coating being removed from packing, and not from sample proteins remaining adsorbed on the column packing. The results of the carbon analyses were used to calculate the percent organic material lost from each column packing upon successive processing of samples by comparison of the original carbon content with those after a given number of column volumes had been processed through each column.

The data presented in Table 2 indicate that the zirconium stabilized chromatographic packings of this invention can process a significantly larger number of throughput fluid column volumes (4159 at pH 8.25) than the unstabilized packing at the same pH (138) and that the new packing can function well in a wide pH range. As can be further seen from the data in Table 2, there was significant bonded phase lost from the unstabilized packing after only 138 column volumes, whereas the zirconium stabilized packing exhibited only approximately one-half the weight loss after 4159 column volumes under identical conditions.

TABLE 2

| Packing | pH of Eluent | # of Column Volumes | % Loss of Bonded Phase (% C Remaining) |
|---|---|---|---|
| Zirconium Stabilized PSM 150 Diol | 3.0 | 1172 | 6 (3.72) |
| Zirconium Stabilized PSM 150 Diol | 7.0 | 3600 | 7 (3.69) |
| Zirconium Stabilized PSM 150 Diol | 8.25 | 4159 | 16 (3.32) |
| Zirconium Stabilized PSM 150 Diol | 9.2 | 979 | 16 (3.35) |
| Unstabilized PSM 150 Diol | 8.25 | 138 | 31 (2.19*) |

*Initial carbon content: 3.19% C.

Data presented in Table 3 also demonstrate the improved properties and increased utility of zirconium-stabilized chromatograhic packings. In this experiment, carried out at pH=8.25, lysozyme was used to detect silanol groups which have become reexposed through the degradation of the silane coating during chromatography. The elution-volume related constant, k', of the lysozyme increases as the organosilane coating (the bonded phase) is degraded since the basic enzyme is being exposed to increasing amounts of acidic surface silanol groups. The constant, k', is defined as follows:

$$k' = \frac{V_r - V_m}{V_m}$$

where $V_r$ is elution volume for the eluate of interest and $V_m$ is permeation volume as determined by using a $NaN_3$ solution; $V_m$ for both packings in this Example was determined to be 5.2. The delayed elution of lysozyme is represented by the need for increased amount of eluent (higher $V_r$) which, in turn, leads to higher k' values. As can be seen from Table 3, the zirconium-stabilized silanized column packing shows almost no increase in k' even after 3489 throughput fluid volumes while the unstabilized silanized packing is no longer practically useful after only 135 throughput volumes.

TABLE 3

| Packing | # of Column Volumes | $V_r$ | K' |
|---|---|---|---|
| Zirconium Stabilized PSM 150 Diol | 0 | 5.04 | −0.03 |
| | 55 | 5.04 | −0.03 |
| | 498 | 5.15 | −0.01 |
| | 997 | 5.25 | 0.01 |
| | 1883 | 5.41 | 0.04 |
| | 2991 | 5.51 | 0.06 |
| | 3489 | 5.62 | 0.08 |
| Unstabilized PSM 150 Diol | 0 | 5.3 | 0.02 |
| | 35 | 6.29 | 0.21 |
| | 40 | 6.60 | 0.27 |
| | 135 | 19.24 | 2.70 |

EXAMPLE 4

A. PREPARATION OF MIXED METAL STABILIZED POROUS SILICA MIROSPHERES

The procedure of Example 1 was repeated exactly utilizing 10 g of Zorbax®PSM 150 silica and 10 mL each of 20% (w/v) solutions of zirconyl chloride and ferric nitrate in place of zirconyl chloride to provide stabilized silica microspheres.

B. SILANIZATION OF MIXED METAL STABILIZED POROUS SILICA MICROSPHERES

The procedure of Example 2 was repeated exactly utilizing the stabilized produce of Example 4A above to provide a mixed metal stabilized chromatographic packing.

EXAMPLE 5

A. PREPARATION OF IRON STABILIZED POROUS SILICA MICROSPHERES

The procedure of Example 1 was repeated exactly utilizing 10 g of Zorbax®PSM 150 silica and 10 mL 20% (w/v) solution of ferric nitrate in place of zirconyl chloride to provide stabilized silica microspheres.

B. SILANIZATION OF IRON STABILIZED POROUS SILICA MICROPHERES

The procedure of Example 2 was repeated exactly utilizing the stabilized product of Example 5A above to provide an iron stabilized chromatographic packing.

EXAMPLE 6

PREPARATION OF ANION EXCHANGE PACKINGS

A. Synthesis of 4NP-Diol Intermediate

A 100-gram batch of silanized packing prepared as described in Example 2 was placed into a 500 mL 3-neck flask containing a mixture of 600 mL tetrahydrofuran (THF) and 40 mL pyridine. The slurry was dried by azeotropic distillation using a Dean-Stark trap. 38.3 grams of p-nitrophenylchloroformate was added to the slurry and was then refluxed at 65° C. for 16 hours to form the 4-nitrophenyl diol derivative (4NP-diol). The product was filtered under vacuum through a porous glass filter funnel and washed with 200 mL THF. The product was refluxed for 15 minutes at 65° C. with 200 mL of 80% (v/v) aqueous THF, filtered, washed with 200 mL THF, refluxed for 15 minutes at 65° C. in 200 mL THF, filtered, and washed again with 200 mL THF and then with 200 mL Freon®TF solvent (registered trademark of E. I. du Pont de Nemours Co., Inc., Wilmington, DE 19898). The product was transferred to a vacuum oven and dried for 2 hr. at 110° C. (20 inches mercury). An elemental analysis of this 4NP-diol intermediate indicated 9.03% C, 0.88% H, and 0.67% N based on duplicate analyses.

B. Preparation of Weak Anion Exchange Packing 50 g of the 4NP-diol intermediate prepared in Example 6A above was refluxed for 30 minutes in a solution of 20 g 3,3'-iminobispropylamine in 450 mL THF. The product was filtered under vacuum through a sintered glass filter funnel, washed with 200 mL THF, again refluxed for 5 minutes with 200 mL 80% (v/v) aqueous THF, filtered, refluxed for 5 minutes with 200 mL THF, filtered again, and then washed successively with 200 mL THF and 20 mL Freon®TF solvent. The final product was air dried for 1 hour at room temperature followed by 1 hour vacuum drying at 110° C. under 22 inches mercury in a nitrogen atmosphere. Elemental analysis of the weak anion exchange packing indicated 7.64% C, 1.36% H, and 1.70% N (duplicate analyses).

C. Preparation of Strong Anion Exchange Packing 10 g of the weak anion exchange packing prepared in Example 6B above was refluxed for 18 hours in 200 mL ethanol containing 2 g sodium bicarbonate and 20 g methyl iodide. The product was filtered, washed successively with 200 mL each of deionized water and methanol. A second wash for 15 minutes in 250 mL methanol was followed by filtration and a final wash in 200 mL Freon®TF. The product was dried in a vacuum oven at 110° C. under 22 inches mercury in a nitrogen atmosphere. Elemental analysis indicated 7.91% C, 1.56% H, and 1.52% N (duplicate analyses).

EXAMPLE 7

PREPARATION OF CATION EXCHANGE PACKINGS

A. Preparation of Weak Cation Exchange Packing

A 10-g quantity of the weak anion exchange packing prepared in Example 6B above was refluxed for 2.5 hours in a 500 mL 3-necked flask containing 250 mL THF, 5 mL pyridine, and 1.8 g of succinic anhydride. The product was filtered and washed with 200 mL methanol. A second 200 mL volume of methanol was added and the product refluxed for 5 minutes followed by filtration and washing with 200 mL Freon®TF solvent. The final product was dried in a vacuum oven for 1 hour at 110° C. under 22 inches mercury.

B. Preparation of Strong Cation Exchange Packing

Taurine (13.8 g) was added to 300 mL 0.01M $Na_2HPO_4$ in a 3-necked flask and approximately 12 mL 0.1N NaOH added to adjust pH to about 8.5. γ-glycidoxy-propyltrimethoxysilane (GPTMS, 6.1 mL) was then added to the mixture refluxed for 1 hour. After cooling, 15 g of the zirconium-stabilized Zorbax ® prepared in Example 1 was added to the product and this mixture was refluxed for 16 hours. The product was filtered, refluxed for 5 minutes in 300 mL of a 0.001M dibasic sodium phosphate buffer, filtered again, and refluxed for 5 minutes in 300 mL methanol. The product was again filtered, refluxed for 5 minutes in 300 mL THF, filtered, washed with 300 mL Freon®TF, and vacuum dried at 110° C. under 22 inches mercury.

To 15 g of this product was added 12 g of GPTMS in 350 mL 0.01M $Na_2HPO_4$, refluxed for 16 hr., the product filtered, refluxed for 5 minutes in 300 mL methanol, filtered again, refluxed in 300 mL THF, filtered again, and finally washed with 300 mL Freon®TF solvent. The product was air dried followed by vacuum drying at 110° C. under 22 inches mercury for 16 hours. This complete silanization was repeated twice in its entirety. Analysis of the final product indicated 5.46% carbon; 1.12% hydrogen, and 0.294% hydrogen.

EXAMPLE 8

PREPARATION OF HYDROPHOBIC CHROMATOGRAPHIC PACKING

A 20-g slurry of the 4NP-diol synthesized in Example 6A was prepared in 350 mL THF in a 3-necked flask. The slurry was dried by azeotropic distillation using a Dean-Stark trap. N-octylamine (10 g) was added and the slurry refluxed for 16 hours. The resulting product was filtered, washed with 100 mL THF, refluxed for 5 minutes in 150 mL THF, filtered, washed successively with 100 mL THF and 100 mL Freon®TF, and air dried. The product was vacuum dried at 110° C. under 22 inches mercury for 16 hours. Analysis indicated 9.64% carbon, 1.64% hydrogen and 0.63% nitrogen.

A similar procedure can be used to prepare additional hydrophobic chromatographic packings by substituting any alkylamine in the series C1–C24 for the n-octylamine used above.

I claim:

1. Surface-stabilized, porous silica bodies having uniform pore size and a particle diameter range of about 0.5–100 microns and having partial surface coverage of metal oxide in quantities insufficient to form a continuous layer over the silica but sufficient to effect an improvement in hydrolytic stability as compared to uncoated silica, thereby providing a surface mosaic of metal oxide and silicon oxide.

2. The surface-stabilized silica bodies of claim 1 wherein the surface coverage is in the range of approximately 0.25 to less than 4 μmole metal compound per square meter of silica surface area.

3. The surface-stabilized silica bodies of claim 1 wherein the starting material is uniform-sized silica microspheres.

4. The surface-stabilized silica bodies of claim 3 wherein the microspheres are prepared by a process comprising the steps of:
   (A) forming a sol of uniform-sized colloidal silica particles in a polar liquid, wherein the colloidal particles have hydroxylated surfaces and are dispersible in said polar liquid;
   (B) forming a mixture of the sol with a polymerizable organic material which is initially sufficiently miscible in said polar liquid to form a uniform mixture;
   (C) initiating polymerization of the organic material in said mixture to cause coacervation of the organic material and said colloidal particles into substantially spherical microspheres having a diameter of about 0.5–20.0 microns;
   (D) solidifying the microspheres so formed;
   (E) collecting, washing and drying said microspheres; and
   (F) oxidizing said microspheres to elevated temperatures to burn off the organic material without melting said colloidal particles.

5. The surface-stabilized silica bodies of claim 4 wherein the colloidal silica particles have a size range of 5–500 millimicrons and wherein the polymerizable organic material is urea/formaldehyde or melamine/formaldehyde.

6. A chromatographic packing comprising surface-stabilized, porous silica bodies having uniform pore size and a particle diameter range of about 0.5–100 microns, having partial surface coverage of metal oxide in quantities insufficient to form a continuous surface layer over the silica but sufficient to effect an improvement in hydrolytic stability as compared to uncoated silica and having a covalently attached organosilane coating.

7. The chromatographic packing of claim 6 wherein the surface coverage is in the range of approximately 0.25 to less than 4 μmole metal compound per square meter of silica surface area.

8. The chromatographic packing of claim 6 wherein the silica bodies are microspheres prepared by a process comprising the steps of:
   (A) forming a sol of uniform-sized colloidal silica particles in a polar liquid, wherein the colloidal particles have hydroxylated surfaces and are dispersible in said polar liquid;

(B) forming a mixture of the sol with a polymerizable organic material which is initially sufficiently miscible in said polar liquid to form a uniform mixture;

(C) initiating polymerization of the organic material in said mixture to cause coacervation of the organic material and said colloidal particles into substantially spherical microspheres having a diameter of about 0.5–20.0 microns;

(D) solidifying the microspheres so formed;

(E) collecting, washing and drying said microspheres; and (F) oxidizing said microspheres to elevated temperatures to burn off the organic material without melting said colloidal particles.

9. The chromatographic packing of claim 6 wherein the metal oxide is zirconium oxide.

10. A process for preparing surface-stabilized, porous silica bodies comprising the steps of:

(A) mixing an aqueous suspension of porous silica bodies with an aqueous solution of a metal compound both in amounts sufficient to provide a final average coverage in the range of approximately 0.25 to less than 4 $\mu$mol metal compound per square meter of silica surface area;

(B) removing trapped air from the silica body pore structure, for example, by boiling the suspension at reduced pressure;

(C) separating the solids from the solution;

(D) drying the solids to remove surface moisture; and (E) heating to temperatures in the range of 600°–1000° C. for from 10 to 72 hours.

11. The process of claim 10 wherein the porous silica bodies are microspheres prepared by a process comprising the steps of:

(A) forming a sol of uniform-sized colloidal silica particles in a polar liquid, wherein the colloidal particles have hydroxylated surfaces and are dispersible in said polar liquid;

(B) forming a mixture of the sol with a polymerizable organic material which is initially sufficiently miscible in said polar liquid to form a uniform mixture;

(C) initiating polymerization of the organic material in said mixture to cause coacervation of the organic material and said colloidal particles into substantially spherical microspheres having a diameter of about 0.5–20.0 microns;

(D) solidifying the microspheres so formed;

(E) collecting, washing and drying said microspheres; and (F) oxidizing said microspheres to elevated temperatures to burn off the organic material without melting said colloidal particles.

12. The process of claim 10 wherein the metal compound is a salt of at least one of the following: Zr, Co, Fe, Al, Ti, Mo, Hf, Ni, Zn and Th.

13. The process of claim 12 wherein the metal salt is selected from the group consisting of $ZrBr_4$, $ZrCl_4$, $ZrOSO_4$, $ZrO(NO_3)_3$, $ZrOCO_2$ and $ZrOCl_2$.

14. Surface-stabilized, porous silica bodies having uniform pore size and a particle diameter range of about 0.5–100 microns and having partial surface coverage of zirconium oxide in the amount of approximately 1 $\mu$mole of oxide per square meter of silica surface area.

15. A chromatographic packing comprising surface-stabilized, porous silica bodies having uniform pore size and a particle diameter range of about 0.5–100 microns and having partial surface coverage of zirconium oxide in the amount of approximately 1 $\mu$mole of oxide per square meter of silica surface area and having a covalently attached organosilane coating.

* * * * *